(No Model.)

J. G. HOLLINGSWORTH.
DENTAL TOOL.

No. 527,690. Patented Oct. 16, 1894.

WITNESSES:
Edw. F. Simpson, Jr.
Wm. Rothwell

INVENTOR
J. G. Hollingsworth
By Atty J. S. Peyton

UNITED STATES PATENT OFFICE.

JEPTHA G. HOLLINGSWORTH, OF KANSAS CITY, MISSOURI, ASSIGNOR TO THE S. S. WHITE DENTAL MANUFACTURING COMPANY, OF PHILADELPHIA, PENNSYLVANIA.

DENTAL TOOL.

SPECIFICATION forming part of Letters Patent No. 527,690, dated October 16, 1894.

Application filed August 25, 1894. Serial No. 521,319. (No model.)

*To all whom it may concern:*

Be it known that I, JEPTHA G. HOLLINGSWORTH, a citizen of the United States, residing at Kansas City, in the county of Jackson and State of Missouri, have invented certain new and useful Improvements in Artificial Tooth-Crown Drivers; and I do hereby declare the following to be a full, clear, and exact description of the invention, such as will enable others skilled in the art to which it appertains to make and use the same.

My invention relates to an implement for driving or forcing artificial tooth crowns and bands thereof upon natural teeth or roots thereof.

As is well known in setting an artificial tooth crown of metal upon a root or tooth in the mouth of a patient the band or tubular body of the crown is first made to tightly fit the natural root or tooth properly prepared to receive it. The band is then removed and the cusp end added thereto to complete the crown which is then driven into place upon the tooth or root. In this driving operation considerable force has to be used. Heretofore it has been customary to drive the crowns into place by blows struck by an ordinary mallet upon an instrument held against the crown being adjusted to a tooth or root. Such operation is tedious, and difficulty is experienced in driving on the crowns evenly. Now, by the employment of a driver constructed in accordance with my invention the crowns may be securely and speedily applied.

In the accompanying drawings which show a suitable embodiment of my improvements, Figure 1 is a view in side elevation, and Fig. 2 a central longitudinal section of my improved implement. Fig. 3 is a view of the handle of the implement, detached; and Figs. 4, 5, 6 and 7 show various interchangeable tools designed to be used with the implement.

A tubular casing A contains a plunger or hammer B which is adapted to reciprocate therein. A handle C is fitted to and closes the rear end of the casing, and a tubular nose piece D is detachably fitted to the front end of the casing. A coiled spring B' is confined in the casing between the hammer B and the handle C for a purpose in turn to be explained.

The tubular nose piece D is connected to the casing A by screw threads $d$, and receives the shank portion E' of a tool holder E which is adapted to have a slight endwise movement in the casing nose piece. The tool holder shank is provided adjacent to its inner end with a cross-pin $e$, and a ring F surrounding the tool holder shank is pressed against this pin by a spring $f$ contained within the enlarged portion D' of the bore of the nose piece and surrounding the shank of the tool holder. Another cross-pin $e'$ of the tool holder shank is adapted to bear against the outer end of the nose piece which is provided with a detent consisting of a series of notches $g$ to be engaged by this cross pin.

It will be seen that by pulling the tool holder outward so as to disengage its cross pin from the nose piece detent, the tool holder may be turned relatively to the casing and handle and then released so as to allow engagement of the cross pin with the detent to lock the tool holder in its adjusted position, the spring $f$ insuring engagement of the cross pin with the detent when outward pull upon the tool holder ceases.

The hammer B is provided with suitable means by which to move it against the pressure of the spring B', a knob or finger piece G being shown as provided for this purpose. This finger piece is adapted to slide in a slot A' in the casing A. By forcing the hammer rearwardly by means of the finger piece the hammer-actuating spring is compressed, and when the finger piece is released the spring impels the hammer forward and it delivers a blow upon the tool holder. The force of the blow is governed by the distance the finger piece is moved. To lessen noise and shock the hammer is provided with a cushion of hard rubber or other suitable material.

The tool holder is adapted to receive various forms of detachable and interchangeable tools suitable for use in driving crowns and bands thereof upon prepared teeth or roots. As shown the tool holder is provided with a threaded socket $h$ into which is screwed the shanks of the tools employed.

In Fig. 2 is shown a tool suitable for driving on a porcelain faced gold crown, the tool consisting of a head K of hard rubber, wood, &c., having a yielding facing $k$, preferably of soft rubber, with the head detachably fitted in a carrier L, in which it is dovetailed, while this carrier is screwed to one end of a straight shank $l$ which is screwed into the tool holder socket $h$. This tool is shown as formed with a V-shaped operating face, but the face may be of any suitable shape to best adapt it for driving on the various crowns to be fitted in place.

Figure 1:
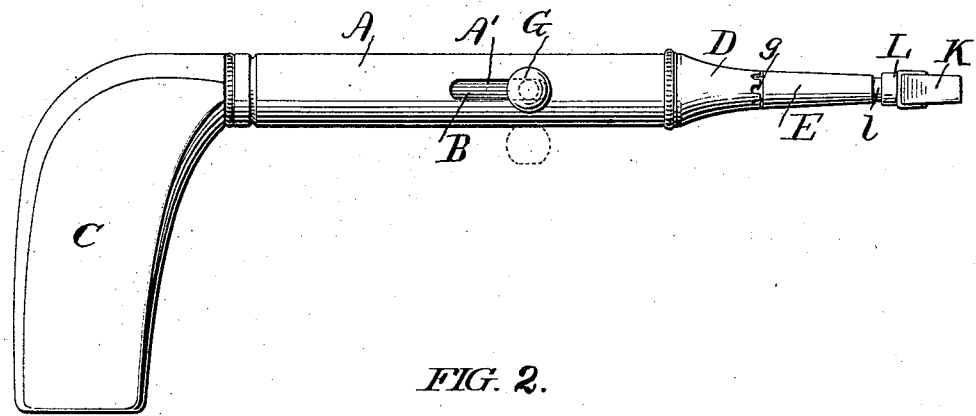
Figure 2:
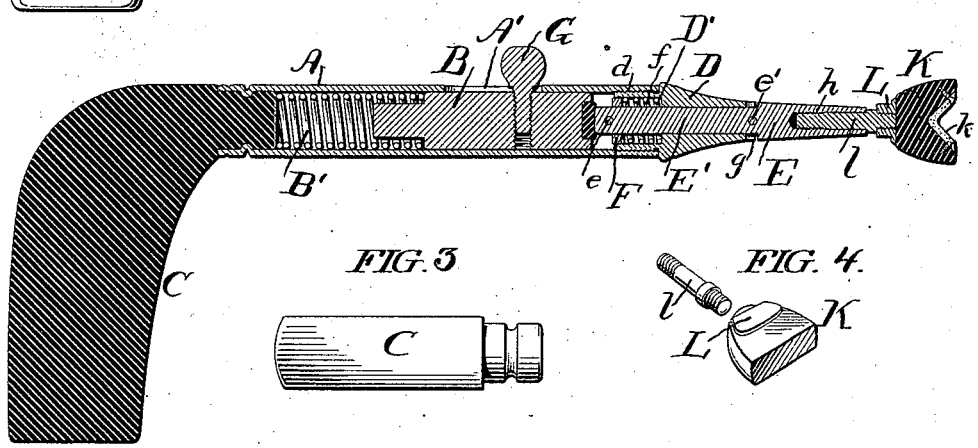
Figure 3:
Figure 4:
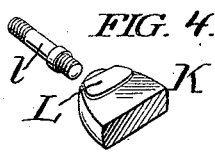
Fig. 4 shows a flat faced tool head fitted in its carrier L, the shank $l$ being detached.
Figure 5:
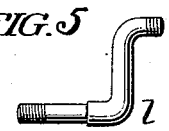
Fig. 5 shows an angular tool shank adapted for use with suitable carriers and tool heads, such as shown by Figs. 2 and 4.
Figure 6:
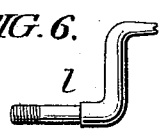
Figs. 6 and 7 show tools having angular shanks and suitable for use in fitting the crown bands or tubular bodies upon roots or teeth, a crown band being also shown in Fig. 7. These crown band tools, like the other tools, are adapted by their shanks to be screwed into the tool holder socket $h$, it will be seen, and the heads or faces of the tools are recessed to engage the bands.
Figure 7:
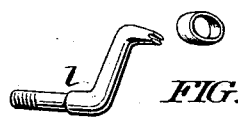

It will be seen that by the employment of the turning tool holder, the angular tool shank and means for securing the tool holder in the position to which it may be adjusted by turning, provision is made for delivering direct blows of the tool upon crowns or bands being applied to any tooth or root in the mouth of a patient.

I do not wish to be understood as confining my invention to the details of construction hereinbefore specifically set forth, as my improvements may be modified in various respects while still retaining essential features of my invention. For instance, instead of the spring-actuated hammer, an automatic or machine-driven hammer may be employed in well known way.

I claim as my invention—

1. The combination of the tubular casing, the hammer therein, means for actuating the hammer, the adjustable turning tool holder, means for securing the tool holder in its position of adjustment, and the detachable driving tool, substantially as and for the purpose set forth.

2. The combination of the tubular casing, the hammer therein, means for actuating the hammer, the adjustable turning tool holder, means for securing it in its position of adjustment, and the driving tool having the angular shank, substantially as and for the purpose set forth.

3. The combination of the tubular casing, the spring-actuated hammer, means for retracting the hammer, the adjustable turning tool holder, and means for securing the tool holder in its position of adjustment, substantially as and for the purpose set forth.

In testimony whereof I affix my signature in presence of two witnesses.

JEPTHA G. HOLLINGSWORTH.

Witnesses:
EDW. F. SIMPSON, Jr.,
R. DALE SPARHAWK.